Jan. 5, 1971     B. SCHREIBER     3,552,878

NOZZLE-RING ASSEMBLY FOR AN EXPANSION TURBINE

Filed Oct. 4, 1968     2 Sheets-Sheet 1

Bernhard Schreiber
INVENTOR.

BY

Karl J. Ross
Attorney

Jan. 5, 1971  B. SCHREIBER  3,552,878

NOZZLE-RING ASSEMBLY FOR AN EXPANSION TURBINE

Filed Oct. 4, 1968  2 Sheets-Sheet 2

INVENTOR:
Bernhard Schreiber

BY

Karl G. Ross
Attorney

United States Patent Office 3,552,878
Patented Jan. 5, 1971

3,552,878
NOZZLE-RING ASSEMBLY FOR AN
EXPANSION TURBINE
Bernhard Schreiber, Lechenich, Germany, assignor to
Linde Aktiengesellschaft, Hollriegelskreuth, Germany,
a corporation of Germany
Filed Oct. 4, 1968, Ser. No. 765,255
Claims priority, application Germany, Oct. 4, 1967,
1,576,973
Int. Cl. F01d *15/06, 1/00*
U.S. Cl. 415—217            11 Claims

ABSTRACT OF THE DISCLOSURE

A nozzle ring for an expansion turbine comprises two flat rings with an annular disk sandwiched between them. The disk is formed with inwardly opening tangential notches which form passages with confronting flanks of the rings. A sectoral channel formed in one of the rings acts as a manifold to supply compressed gas to the passages subtended thereby.

---

My invention relates to a nozzle-ring assembly for use in an expansion turbine, in particular for an expansion turbine used in air-rectification installations, gas-separation or liquefaction plants, etc. in which the expansion of a compressed or liquefied gas is required.

Such expansion turbines are known wherein a rotor mounted on a shaft is driven by expanding gases rushing out of nozzles on a nozzle ring enclosing the rotor head. This nozzle ring has a plurality of nozzles directed generally tangentially at vanes on the rotor.

The present nozzle rings and their manufacturing techniques are beset by nearly insurmountable problems. This is mainly the result of the extremely precise tolerances which must be observed since each nozzle or duct must be very exactly shaped and dimensioned for optimum performance with the turbine, the shapes being usually very complicated. For extremely high-speed turbines use for liquefaction of hydrogen or helium, for example, these nozzles may measure in the tenths of a millimeter.

Such exact nozzle rings are generally manufactured by milling, engraving or spark-discharge erosion which must individually form the nozzles and suffer from inexactitudes measuring in the hundredths of millimeters which may completely ruin the performance of the nozzle ring.

Therefore it is an object of my invention to provide an improved nozzle ring for an expansion turbine of the above-described type which is both inexpensive and simple to manufacture.

I do this by making my nozzle ring in a three-part sandwich. Thus, I prefer to form the nozzles as notches on a thin annular disk or plate sandwiched between two flat-faced rings, one of which at least is formed as a manifold for the nozzles. This inner plate or disk, like the outer members, has a central opening and the notches are tangentially open along its inner periphery.

The faces of the rings and the disk are machined to be very smooth and flat (e.g. by surface grinding or honing), with the exception of the manifold compartment in one or both of the rings. The notches are simply stamped out of the disk, one at a time, by groups, or all at once. Thus, no part of the production presents extremely difficult problems of manufacture and accuracy.

According to a feature of my invention, the use of a carefully machined disk of uniform thickness makes for nozzles of exactly the same height.

Furthermore, I have found that many turbines may use nozzle rings of the same diameter, but of different thicknesses for different fluids or operating parameters, the same stamping machine using the same die can produce nozzle-ring center disks for different turbines.

According to a further feature of my invention, these center disks are produced from foil-like plates readily obtained on the market. These plates are preferably of some very hard material such as 17–7 nickel-chromium steel cold-drawn and may be hard-chromium plated to prevent wear. In addition, it is advantageous to use at least one solder foil to bond at least one of the rings to the disk. In this case the thickness of this solder foil must be taken into account in calculation of the nozzle height or depth.

A further feature of my invention provides for prestressed-spring means holding the nonbonded sections of the nozzle-ring assembly together.

The above and other features and advantages of my invention will become more readily apparent from the following description with reference to the drawing in which.

Figure 1:
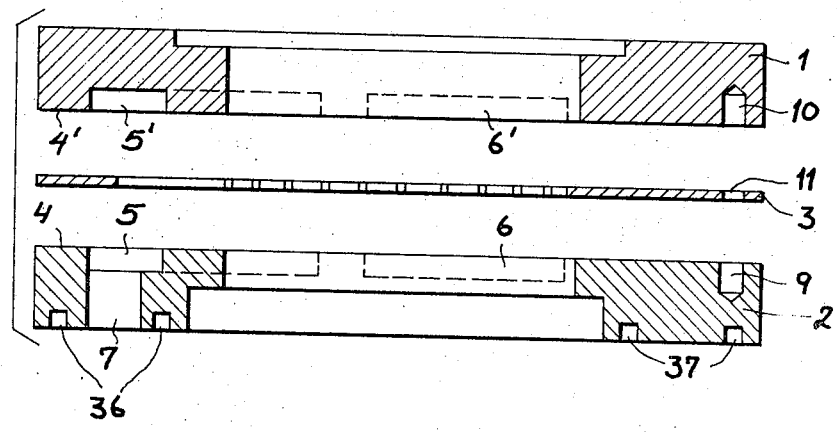
FIG. 1 is an axial cross section through a nozzle ring according to my invention, in exploded view.

FIG. 1 shows two rings 1 and 2 and an annular disk 3 between their flat or planar confronting flanks 4 and 4'. These flanks 4 and 4', which may be surface ground or honed, are formed respectively with sectoral channels or chambers 5, 5' and 6, 6' acting as manifolds and with bores 9 and 10 adapted to receive a centering pin and in line with a hole 11 in the disk 3. Each of the sectoral channels subtends an arc of the disk and registers with the nozzles along this arc. The underside of the ring 2 is formed with bores 36 and 37 designed to receive pins (38 in FIG. 4) to prevent the whole assembly from rotating when installed.

Figure 2:
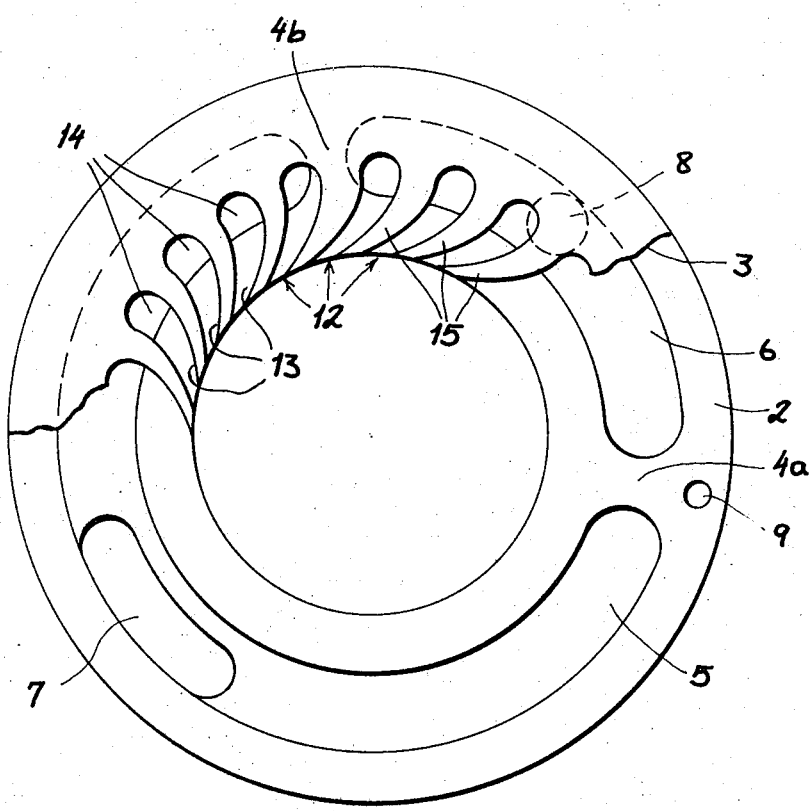
FIG. 2 is a top view of the lower section of my nozzle ring with part of the center disk shown thereon.

In FIG. 2 the angularly spaced sectoral channels 5 and 6 of the ring 2 can be seen in greater detail. They are fed with compressed gas by openings 7 and 8 respectively and are separated by partitions 4a and 4b. The annular disk 3 is shown here with its notches, cutouts or nozzles 12 separated by portions 15. These notches 12 have generally oval enlarged or bulbous closed ends 14 leading over constricted necks to the tangential outlets 13; the notches thus are generally pear-shaped.

Figure 3:
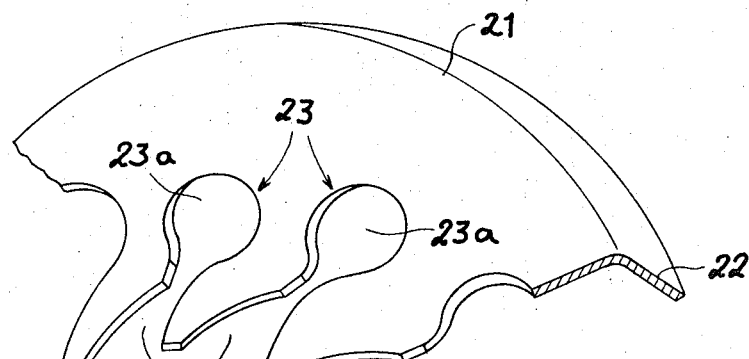
FIG. 3 is a detail of a second embodiment of the center disk according to my invention.

FIG. 3 shows a further embodiment of an annular disk 21 according to my invention. This disk 21 has an outer downwardly turned flange 22 which serves to hold it in place and center it in use. The notches 23 are here formed with round bulbous closed ends 23a and flared open ends 23b. The nozzle outlets 13 and 23b may be defined between curved boundaries as shown. The particular shape and height of the passages formed by the notches 12 or 21 depends on the application of the eventual nozzle-ring assembly.

Figure 4:
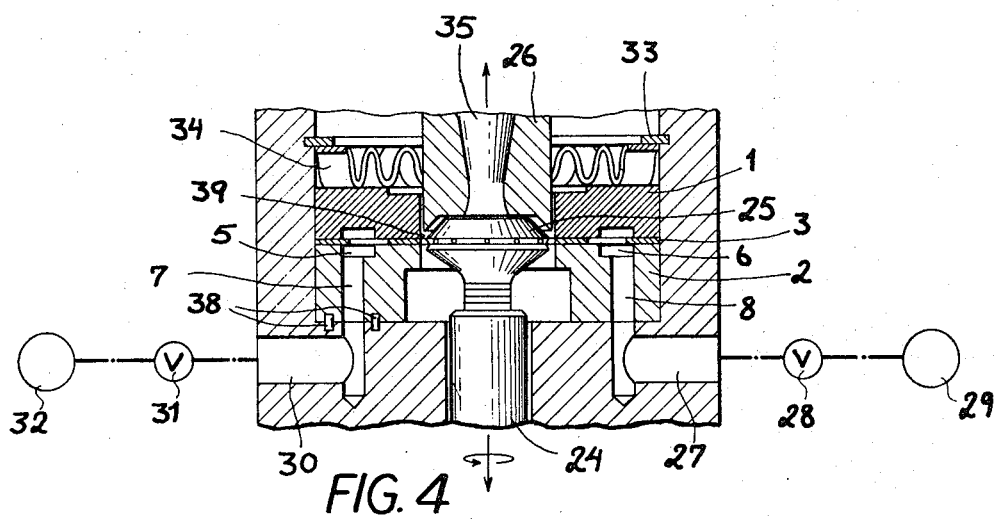
FIG. 4 is an axial section through an expansion turbine in accordance with my invention.

An expansion turbine of the type shown in commonly owned U.S. Pat. No. 3,398,929 entitled "Shaft Journaling Assembly for Rotary Machines" is shown in FIG. 4 equipped with my improved nozzle-ring assembly. The turbine shaft 24 carrying a turbine rotor 25 is rotatable in a housing 23. My nozzle-ring assembly 1, 2, 3 is mounted in this housing 23 and held axially in place by a prestressed undulating spring 34 held in turn by a snap ring 33. Radially it is prevented from turning by pins 38 seated in the housing 23 and in the bores 36.

Compressed gas is fed from two sources 32 and 29 through respective valves 31 and 28 and channels 30 and 27 to the openings 7 and 8 of the section ring 2. This gas passes through the manifold channels 5 and 6 and escapes into an expansion chamber 39 through the notches 12 to strike and rotate the rotor 25. Subsequently it escapes from the chamber 39 through an opening 35 in a member 26. A number of nozzles 12 etc. may be fed with gas selectively at each sector to improve the efficiency of the turbine under the principles contained in commonly owned Pat. No. 3,350,301 issued Apr. 13, 1965.

Figure 5:
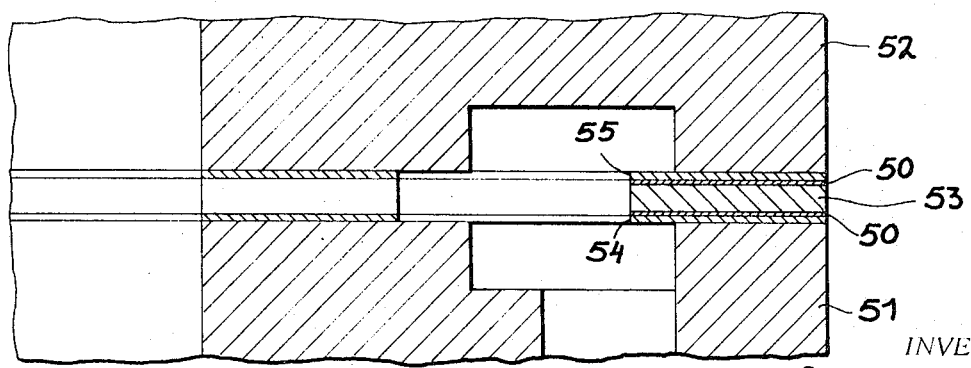
FIG. 5 is a fragmentary section through an alternative embodiment.

The disks 53 according to my invention is preferably made of 17–7 chromium-nickel cold-drawn steel, e.g. the steel commercially designated X12 CrNi 177 or 17–7 PH. It is also advantageously provided with a hard-chromium coating 50 to prevent wear and is fastened to the rings 51 and/or 52 with the aid of one or two solder foils 54, 55 (FIG. 5).

The improvement described and illustrated is believed to admit of many modifications within the ability of persons skilled in the art, all such modifications being considered within the spirit and scope of the invention except as limited by the appended claims.

I claim:
1. A nozzle-ring assembly for a turbine, comprising two relatively thick generally coaxial rings having mutually confronting annular planar surfaces and a relatively thin sheetmetal flat annular disk having a thickness constituting a small fraction of the axial thickness of said assembly sandwiched between said surfaces and formed along its inner periphery with a plurality of cutouts opening at said surfaces and defining inwardly and tangentially extending channels parallel to planar surface while forming with the surfaces of said rings respective fixed turbine nozzles adapted to communicate with a fluid-distribution network.

2. The assembly defined in claim 1 wherein said disk is stamped from steel and said network includes a compartment formed in at least one of said rings and opening at its said surface outwardly of the inner periphery of said rings, said nozzles having enlarged portions communicating with said compartment, said compartment extending over only an arc sector of said disk.

3. The assembly defined in claim 1 wherein said disk is stamped from hard cold-drawn steel.

4. The assembly defined in claim 1 wherein said disk is formed with a wear-resistant coating.

5. The assembly defined in claim 1, further comprising prestressed spring means urging said rings against said disk.

6. A nozzle-ring assembly for a turbine, said assembly comprising two generally coaxial rings having confronting generally planar flanks and an annular sheetmetal disk sandwiched therebetween, said disk being formed along its inner periphery with cutouts open at the faces of the disk and defining inwardly opening generally tangential notches forming a plurality of passages with confronting planar flanks of said rings, means for supplying a compressed gas to said passages including a manifold formed by at least one of said rings, said one of said rings being provided with at least one compartment opening at the corresponding flank and registering with a plurality of said notches, and at least one solder foil between said disk and at least one of said flanks bonding said disk to the corresponding ring.

7. An expansion turbine comprising housing means accommodating the assembly defined in claim 6 and formed with a gas feed opening communicating with said compartment, and rotor rotatably received in said assembly, said assembly being provided with alignment means for preventing relative rotational movement between said assembly and said housing means, a pair of abutments on said housing, and a spring seated against one of said abutments and holding said assembly against the other of said abutments.

8. The assembly defined in claim 6 wherein said compartment extends only over an arc sector of said disk.

9. The assembly defined in claim 8 wherein said one of said rings is formed with a plurality of said compartments each subtending a respective arc segment of said disk.

10. The assembly defined in claim 6 wherein said disk is composed of 17–7 chromium-nickel cold-drawn steel.

11. The assembly defined in claim 6 wherein said disk is provided with a hard-chromium.

References Cited
UNITED STATES PATENTS

| | | | |
|---|---|---|---|
| 838,088 | 12/1906 | Dean | 253—2 |
| 2,114,285 | 4/1938 | Berger | 230—127 |
| 2,371,248 | 3/1945 | McNamara | 253—2 |
| 2,404,334 | 7/1946 | Whittle | 230—127 |
| 2,646,210 | 7/1953 | Kohlmann et al. | 253—55 |
| 3,112,096 | 11/1963 | Lazo et al. | 253—55 |
| 3,260,505 | 7/1966 | Snyder | 253—77 |

FOREIGN PATENTS

| | | | |
|---|---|---|---|
| 15,947 | 1903 | Great Britain | 253—2 |

HENRY F. RADUAZO, Primary Examiner

U.S. Cl. X.R.

415—203